United States Patent Office 3,296,108
Patented Jan. 3, 1967

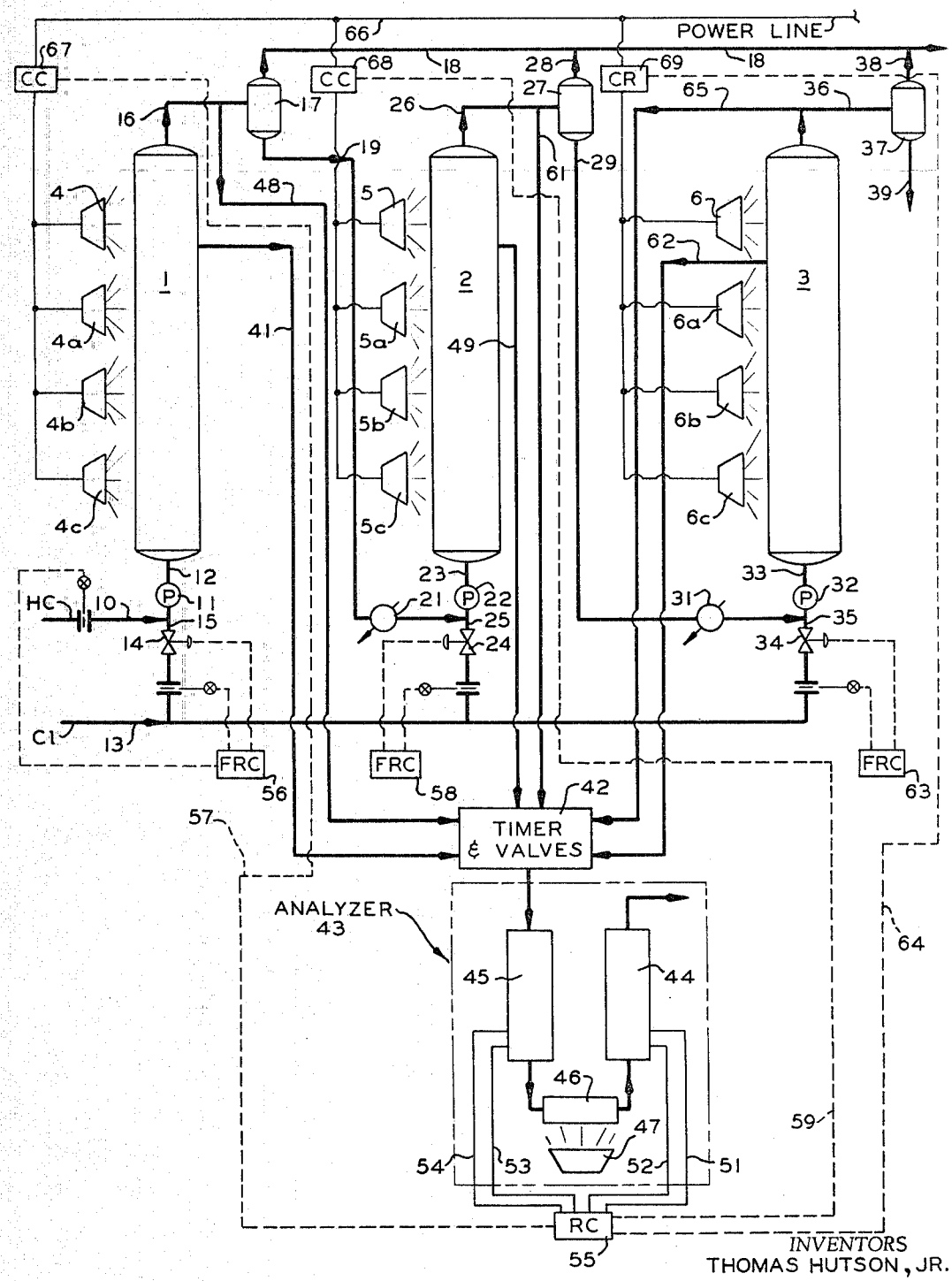

3,296,108
PHOTOHALOGENATION OF HYDROCARBONS
Thomas Hutson, Jr., and René A. Loth, Bartlesville, Okla., assignors to Phillips Petroleum Company, a corporation of Delaware
Filed Dec. 31, 1962, Ser. No. 248,543
5 Claims. (Cl. 204—163)

This invention relates to the halogenation of hydrocarbons. In one aspect this invention relates to a novel method and means for producing monohalogenated hydrocarbons in high yield with respect to dihalogenated hydrocarbon byproducts.

The halogenation of hydrocarbons is known and has been accomplished in both gaseous and liquid phases; thus the production of chlorinated, brominated, iodinated and fluorinated hydrocarbons has been accomplished. Light and particularly ultraviolet light is a known catayslt for the halogenation of paraffin hydrocarbons. The production of monohalogenated hydrocarbons has been difficult because the halogenation reaction occurs stepwise and is not an equilibrium reaction so that, given sufficient residence time and sufficient halogen at reaction conditions, the reaction product would contain no monohalogenated hydrocarbons at all. For many uses, such as the production of linear detergent alkylate, made from alkyl chlorides containing from 7 to 15 carbon atoms, a monohalogenated, e.g., monochlorinated hydrocarbon is required as the starting material.

According to the invention the ratio of monohalides to dihalides in the light-catalyzed halogenation of a liquid hydrocarbon can be increased substantially by halogenating in stages with removal of hydrogen halide and with cooling between stages.

It is an object of this invention to provide a method and means for producing monohalogenated hydrocarbons in high yield. Another object of this invention is to provide a method and means for chlorinating a paraffin hydrocarbon so that high yields of alkyl chlorides are obtained. The provision of a method and means for chlorinating paraffin hydrocarbons in such manner as to minimize the formation of dichlorinated hydrocarbons is still another object of this invention. A further object of the invention is to provide a method and means for automatically controlling the halogenation of a hydrocarbon so as to produce monohalogenated hydrocarbons at high yield. Other objects and advantages of this invention will be readily apparent to one skilled in the art upon studying the disclosure including the detailed description of the invention and the appended drawing wherein:

The sole figure of the drawing is a schematic representation of a halogenation plant incorporating therein the process and apparatus of the invention.

Referring now to the drawing, halogenation reactors 1, 2 and 3 are fabricated from a transparent material such as glass or quartz or of opaque material such as metal and have transparent windows through the walls thereof for the admission of light. Lamps indicated as 4, 4a, 4b and 4c illuminate reactor 1; lamps 5, 5a, 5b and 5c illuminate reactor 2; and lamps 6, 6a, 6b and 6c illuminate reactor 3. The lamps are supplied by current from power line 66 and can be any type of illumination containing light in the range of about 3650 to 6000 Angstrom units. Where practical, sunlight can be substituted for artificial illumination.

A liquid hydrocarbon stream such as normal heptane is passed via conduit 10, pump 11 and conduit 12 to reactor 1. A halogen such as gaseous chlorine is passed via conduit 13, motor valve 14 and conduit 15 to the hydrocarbon stream entering the pump 11. The effluent from reactor 1 is passed via conduit 16 to flash chamber 17 where hydrogen chloride (HCl) is flashed and removed via conduit 18. The liquid product in flash chamber 17, comprising partially chlorinated normal heptane, is removed via conduit 19, cooled in heat exchanger 21 and passed to pump 22 and thence to reactor 2 via conduit 23. Additional chlorine is passed via conduit 13, motor valve 24 and conduit 25 to the hydrocarbon stream passing to pump 22. The effluent from reactor 2 is passed via conduit 26 to flash chamber 27 where HCl is flashed off and removed via conduit 28 and conduit 18. The liquid product in flash chamber 27, comprising additional monochlorinated normal heptane, is passed via conduit 29, heat exchanger 31, pump 32 and conduit 33 to reactor 3. Additional chlorine is passed via conduit 13, motor valve 34 and conduit 35 into the hydrocarbon stream entering pump 32. The effluent from reactor 3 is passed via conduit 36 to flash chamber 37 where HCl is flashed and removed via conduit 38 and conduit 18. The liquid product in flash chamber 37, comprising the chlorinated normal heptane product, is removed via conduit 39.

The chlorination reaction can be controlled manually or automatically by controlling the amount of chlorine admitted via motor valves 14, 24 and 34 so as to produce an effluent product in conduits 16, 26 and 36 containing no residual chlorine; or, alternately, the quantity of chlorine can be set at a preselected value through each of valves 14, 24 and 34 and the intensity of the illumination provided by the lamps or the number of lamps employed at a constant intensity can be controlled to provide the required reaction in the reactors 1, 2 and 3. Control of feed temperature or hydrocarbon flow rate are also alternate of controlling the reaction.

Preferably the operation is controlled automatically by determining the amount of residual chlorine in each reactor prior to being subjected to the final stage of illumination in that reactor and controlling the intensity of illumination provided in each reactor to provide no more residual chlorine at that point than will be reacted by the illumination supplied by the final stage of illumination in each reactor. A sample of the liquid contained in reactor 1 at a point between lamp 4 and lamp 4a is withdrawn via conduit 41 according to the cyclic operation of timer 42 and passed to analyzer 43 which comprises a pair of photoelectric cells 44 and 45 which can conveniently be constructed and operated as photoelectric cells 44 and 45 of U.S. Patent 2,854,585, issued September 30, 1958, to B. J. Simmons. The sample passes through cell 45 and then passes through a transparent tube 46 and is illuminated by lamp 47 which is selected to have sufficient intensity to react the maximum amount of residual chlorine contemplated to be present in the sample. The completely chlorinated sample then passes through cell 44 which acts as a standard cell for comparison with the cell 45. The signal from cell 44 passes via lead lines 51 and 52 and the signal from cell 45 passes via lead lines 53 and 54 to recording controller 55 which is also connected to timer 42 by a common shaft so as to reset current controller 67 so as to increase or decrease the intensity of illumination of lamps 4, 4a, 4b, and 4c illuminating reactor 1 in accordance with the amount of chlorine detected in the sample removed from reactor 1 via conduit 41.

Although not necessary for the operation of the process of the invention but as a safety factor, a sample is taken from the effluent of reactor 1 via conduit 48 by means of timer 42 and passed through analyzer 43 with the results of the analysis being recorded by recording controller 55. In this case the sample should contain no residual chlorine and therefore the sample passing through cells 44 and 45 should be the same so that no difference is detected. This step is in the nature of a safeguard and a check on the efficiency or intensity of the last stage of illumination. As the timer continues its cyclic operation, a sample is taken from reactor 2 via conduit 49 by timer 42 and passed through analyzer 43 which activates recording controller 55 to reset current controller 68 by means of linkage 59 so as to increase or decrease the intensity of illumination being passed to reactor 2 by lamps 5, 5a, 5b and 5c in accordance with the amount of residual chlorine detected in the sample removed via conduit 49. The timer then operates to remove a sample of the effluent of reactor 2 via conduit 61 which sample is analyzed and recorded in the same manner as the sample removed from reactor 1 effluent via conduit 48.

A sample is removed from reactor 3 via conduit 62 by operation of timer 42 and passed through analyzer 43 as hereinbefore described with respect to the samples in conduits 41 and 49. The recording controller 55 resets current controller 69 by means of the mechanical linkage 64 so as to increase or decrease the intensity of illumination passing to reactor 3 by lamp 6, 6a, 6b and 6c in response to the amount of residual chlorine in the sample obtained via conduit 62. A sample of the reactor 3 effluent is passed via conduit 65 through analyzer 43 and the results of the analysis are recorded by recording controller 55 as hereinbefore described with reference to the samples taken via conduits 48 and 61.

The flow controllers 58 and 63 can be flow rate controllers or recording flow rate controllers. Recording flow controllers are preferred so that records of past performances can be studied. These instruments are commercially available. Ratio controller 56 is set to control the ratio of chlorine to hydrocarbon in conduit 12. Ratio controllers can be substituted for flow controllers 58 and 63 if desired. The hydrocarbon flow rate is usually set and the chlorine flow rate adjusted to the hydrocarbon rate.

The analyzer 43 and the controller 55 can be constructed as disclosed in U.S. Patent 2,854,585, referred to above. Suitable instruments are commercially available.

The lamps will preferably be ultraviolet lamps but any lamps which produce some light in the visible range can be employed. Suitable lamps are readily available and can be added or removed as desired.

The current controllers 67, 68 and 69 can be any conventional means for controlling the current to the lamps such as a Variac, voltage regulator and the like.

The process can be also controlled by maintaining the intensity of illumination constant and connecting linkages 57, 59 and 64 to controllers 56, 58 and 63, respectively, so as to control the amount of chlorine admitted to the reactors to that which will all be reacted by the available illumination. In this case controller 56 will be a flow controller instead of a ratio controller.

The reactors will preferably be made of quartz because of its transparency to ultraviolet light; however, glass is suitable. Plastics which are resistant to the halogens utilized and which are transparent to light in the range of 3650 to 6000 Angstrom units are also suitable for the reactors or for use in windows in opaque reactors.

The process is applicable to normally liquid hydrocarbons, e.g., paraffin hydrocarbons having about 5 to 18 carbon atoms per molecule.

The following example will be helpful in attaining an understanding of the invention; however, the example is illustrative and should not be construed as limiting the invention.

EXAMPLE

In a single pass light catalyzed reaction of n-heptane and chlorine to a hydrocarbon conversion of about 35 percent, the following results were obtained:

*Analysis of product*

|  | Weight percent |
|---|---|
| n-Heptane | 65.4 |
| Monochloroheptane | 26.9 |
| Dichloroheptane | 7.7 |

Monochloride to dichlororide ratio=3.5

In a three-stage light catalyzed reaction of n-heptane and chlorine to a hydrocarbon conversion of about 35 percent, the following results were obtained:

*Analysis of product*

|  | Weight percent |
|---|---|
| n-Heptane | 65.9 |
| Monochloroheptane | 30.1 |
| Dichloroheptane | 4.0 |

Monochloride to dichloride ratio=7.5

The n-heptane was substantially saturated with chlorine prior to reaction in each case and HCl was removed after each reaction period. The feed was at room temperature and the reaction product was cooled to room temperature after each reaction period. The temperature rose to about 160 to 190° F. as a result of the reaction in each stage.

The above example shows that the ratio of monochlorides to dichlorides can be increased substantially by chlorinating in stages with removal of hydrogen chloride and with cooling between stages. It is important that chlorine be all reacted in each stage so that no free chlorine is present in the effluent from each stage.

Complete chlorination is advantageously accomplished controlling the residual chlorine in each reactor to that amount which will be reacted by the last lamp or supply of light in each reactor as shown in the drawing.

It is usualy desirable to operate at about 10 to 35 percent conversion of the hydrocarbon; however, the desirable hydrocarbon conversion will be dependent upon the particular hydrocarbon being halogenated and upon the minimum obtainable feed temperature. The optimum hydrocarbon conversion level can easily be determined to provide the maximum yield and maximum ratio of mono- to dihalogenated product for each particular operation. This will depend on the end use of chloroparaffin and the over-all economic situation.

Substantially the same conditions are required for brominating paraffin hydrocarbons as for chlorination. Proper conditions for halogenating other hydrocarbons with other halogens are known to those skilled in the art.

The temperature of the hydrocarbon stream entering each reactor should be as low as possible. The freezing point of the particular hydrocarbon will determine the minimum temperature of feed hydrocarbon.

That which is claimed is:

1. In the process of halogenating a liquid paraffin hydrocarbon wherein the hydrocarbon is reacted with a halogen in the presence of light, the improvement comprising reacting the hydrocarbon and halogen in a plurality of steps; substantially saturating the hydrocarbon with halogen preceding each step; contacting the hydrocarbon and halogen in each step with sufficient light in the form of a plurality of increments to react all of the halogen; detecting and measuring the residual halogen in each step prior to the last increment of light; adjusting the amount of halogen reacted in each step so that substantially no free halogen remains in the effluent of each step; removing hydrogen halide from the effluent of each step; removing the heat of reaction from the effluent of each step; and recovering from the final step halogenated hydrocarbon having a high ratio of mono- to dihalogenated hydrocarbon.

2. Apparatus for halogenating a hydrocarbon comprising a plurality of transparent reactors connected in series; means to illuminate the contents of the reactors; means to pass a hydrocarbon to the first of said reactors; means to remove the effluent from each of said reactors; means to remove hydrogen halide from the effluent from each reactor; means to cool the effluent from each reactor; conduit means to pass the cooled, hydrogen halide-free effluent from each reactor to the next succeeding reactor in series; conduit means to pass halogen to each reactor; a control valve in each of said conduits to pass halogen to each of said reactors; means to detect and measure the residual halogen in each reactor prior to the last increment of illumination in each reactor; and means connected to each of said control valves and responsive to said means to detect and measure the residual halogen to control the amount of halogen which will all be reacted in each reactor.

3. Apparatus for halogenating a hydrocarbon comprising a plurality of reactors; means to illuminate the interior of the reactors; means to supply current to said means to illuminate; means to pass a hydrocarbon to the first of the reactors; means to remove the effluent from each of the reactors; means to remove hydrogen halide from the effluent of each of the reactors; means to cool the effluent from each reactor; means to pass the cooled hydrogen halide-free effluent from each reactor to the next succeeding reactor in series; means to pass halogen to each reactor; a current controller associated with the means to supply current to said means to illuminate; means to detect and measure the residual halogen in each reactor prior to the last increment of illumination in each reactor; and means connected to each of said means to adjust the intensity of illumination and responsive to said means to detect and measure the residual halogen to adjust the intensity of illumination in each of the reactors to that required to react all of the halogen in each of the reactors.

4. The process of claim 1 wherein the amount of halogen reacted is adjusted by varying the amount of halogen utilized to substantially saturate the hydrocarbon.

5. The process of claim 1 wherein the amount of halogen reacted is adjusted by varying the amount of light utilized to catalyze the reaction.

References Cited by the Examiner
UNITED STATES PATENTS

| | | | |
|---|---|---|---|
| 2,459,049 | 1/1949 | Sconce et al. | 204—163 |
| 2,854,585 | 9/1958 | Simmons | 250—209 |
| 2,948,667 | 8/1960 | Limido et al. | 204—163 |

JOHN H. MACK, *Primary Examiner.*

HOWARD S. WILLIAMS, *Examiner.*